(12) United States Patent
Staiger et al.

(10) Patent No.: US 7,875,101 B2
(45) Date of Patent: Jan. 25, 2011

(54) HYBRID MEMBRANE—PSA SYSTEM FOR SEPARATING OXYGEN FROM AIR

(75) Inventors: Chad L. Staiger, Albuquerque, NM (US); Mark R. Vaughn, Albuquerque, NM (US); A. Keith Miller, Albuquerque, NM (US); Christopher J. Cornelius, Blacksburg, VA (US)

(73) Assignee: Sandia Corporation, Albuquerque, NM (US)

( * ) Notice: Subject to any disclaimer, the term of this patent is extended or adjusted under 35 U.S.C. 154(b) by 251 days.

(21) Appl. No.: 12/269,540

(22) Filed: Nov. 12, 2008

(65) Prior Publication Data
US 2010/0116132 A1 May 13, 2010

(51) Int. Cl.
*B01D 53/047* (2006.01)
(52) U.S. Cl. .................... 95/54; 95/96; 95/138
(58) Field of Classification Search ............ 95/54, 95/96, 138
See application file for complete search history.

(56) References Cited

U.S. PATENT DOCUMENTS

| 4,681,602 | A | | 7/1987 | Glenn et al. |
| 5,245,110 | A | * | 9/1993 | Van Dijk et al. ............ 585/733 |
| 6,179,900 | B1 | | 1/2001 | Behling et al. |
| 6,589,303 | B1 | | 7/2003 | Lokhandwala et al. |

OTHER PUBLICATIONS

Peter V. Mercea, et al, Oxygen Separation from Air by a Combined Pressure Swing Adsorption and Continuous membrane Column Process, 1994 Elsevier Science B. V.
International Conference on Carbon Dioxide Utilization (7$^{th}$: 2003: Seoul, South Korea 2004.
K. J. Doshi, et al., Integration of membrand ena dPSA Systems for the Purification of Hydrogen and Production of Oxo Alcohol Syngas, vol./Issue 85(272), Date: 1989, pp. 62-67.
Toshinori Tsuru, et al., Production of High-Purity Oxygen by Continuous Membrane Column Combined with PSA Oxygen Generator, 1994 American Chemical Society.

* cited by examiner

*Primary Examiner*—Robert A Hopkins
(74) *Attorney, Agent, or Firm*—Robert D. Watson

(57) ABSTRACT

A portable, non-cryogenic, oxygen generation system capable of delivering oxygen gas at purities greater than 98% and flow rates of 15 L/min or more is described. The system consists of two major components. The first component is a high efficiency membrane capable of separating argon and a portion of the nitrogen content from air, yielding an oxygen-enriched permeate flow. This is then fed to the second component, a pressure swing adsorption (PSA) unit utilizing a commercially available, but specifically formulated zeolite compound to remove the remainder of the nitrogen from the flow. The system is a unique gas separation system that can operate at ambient temperatures, for producing high purity oxygen for various applications (medical, refining, chemical production, enhanced combustion, fuel cells, etc . . . ) and represents a significant advance compared to current technologies.

25 Claims, 3 Drawing Sheets

HYBRID MEMBRANE—PSA SYSTEM FOR SEPARATING OXYGEN FROM AIR

FEDERALLY SPONSORED RESEARCH

The United States Government has rights in this invention pursuant to Department of Energy Contract No. DE-AC04-94AL85000 with Sandia Corporation.

CROSS-REFERENCE TO RELATED APPLICATIONS

None

BACKGROUND OF THE INVENTION

Room temperature gas separation techniques, used to produce enhanced concentrations of specific gasses found in air, are becoming more refined and finding broader areas of application. Two methods of gas separation at ambient temperatures are membrane separation and PSA (Pressure Swing Adsorption). Typically, PSA generally separates only the nitrogen from a flow of air and produces oxygen at purity levels of 90% to 94%. The major contaminant in this oxygen-rich stream is argon, which is concentrated from its normal level of 1%, through the removal of nitrogen.

Membrane gas separation is a mature technology that has been utilized and commercialized for separating gas mixtures. Oxygen is separated from air by applying a pressure differential across an oxygen-selective material, typically a synthetic polymer. In the system described herein, the membrane is specially formulated to specifically remove some nitrogen and most of the argon from the flow. This is illustrated in FIG. 1. The membrane material separates the oxygen from the air using molecular sieving or a solution-diffusion mechanism. Membrane modules come in varying configurations to meet size, flow and pressure requirements for a desired application. Oxygen with purities ranging from 25% to 40%, also known as enriched oxygen, is typically produced as a byproduct of nitrogen generation.

Producing oxygen gas with purities greater than 98% is not economically feasible because of a lack of highly oxygen selective membrane materials. However, the enriched oxygen stream produced by the membrane can be purified further by pressure swing adsorption to generate high purity (>98%) oxygen.

Pressure swing adsorption (PSA) units are currently used in medical, refining, chemical and gas industries to produce oxygen. For oxygen concentration, the PSA utilizes zeolite materials to capture nitrogen from a flow under elevated pressures, leaving behind an oxygen-rich gas mixture, which is fed under pressure to down stream processes for utilization. While under pressure, the adsorbent material becomes saturated with nitrogen after some interval of time. After saturation with nitrogen, the unit is depressurized to desorb the nitrogen and regenerate the zeolite bed materials. If the flow has been pretreated to remove argon, and a portion of the nitrogen, the PSA system can be reduced in size and become capable producing oxygen flows at concentrations greater than 98% purity.

PSA systems come in various designs, processing the gas flow either continuously in a flow-through design, or in a batch mode where the elevated pressure is cycled from one pressure vessel to an accompanying one. Various designs use proprietary valving and flow recycling to achieve tradeoff in plant size, oxygen purity, and power requirements.

Previous methods of producing high purity oxygen (98% purity) use a two-stage industrial PSA system. Such a system first attempts to produce as high of purity oxygen stream as possible using a large PSA section, and thereafter remove argon using carbon molecular sieve adsorbents. This two-stage process is bulky, energy demanding, and oxygen recovery efficiencies are low. In order to reduce the size and the energy demands of an ambient temperature gas separation process capable of producing 15 L/min at greater than 98% purity, we have devised a method of using highly selective permeable membrane to enrich the stream flowing to a much smaller PSA separation unit.

SUMMARY OF THE INVENTION

A portable, non-cryogenic, oxygen generation system capable of delivering oxygen gas at purities greater than 98% and flow rates of 15 L/min or more is described. The system consists of two major components. The first component is a high efficiency membrane capable of separating argon and a portion of the nitrogen content from air, yielding an oxygen-enriched permeate flow. This is then fed to the second component, a pressure swing adsorption (PSA) unit utilizing a commercially available, but specifically-formulated zeolite compound to remove the remainder of the nitrogen from the flow. The system is a unique gas separation system that can operate at ambient temperatures, for producing high purity oxygen for various applications (medical, refining, chemical production, enhanced combustion, fuel cells, etc . . . ) and represents a significant advance compared to current technologies.

BRIEF DESCRIPTION OF THE DRAWINGS

The accompanying drawings, which are incorporated in and form part of the specification, illustrate various examples of the present invention and, together with the detailed description, serve to explain the principles of the invention.

DETAILED DESCRIPTION OF THE INVENTION

Unless otherwise specified, all gas composition percentages are in mole percent, not weight percent.

Figure 1:
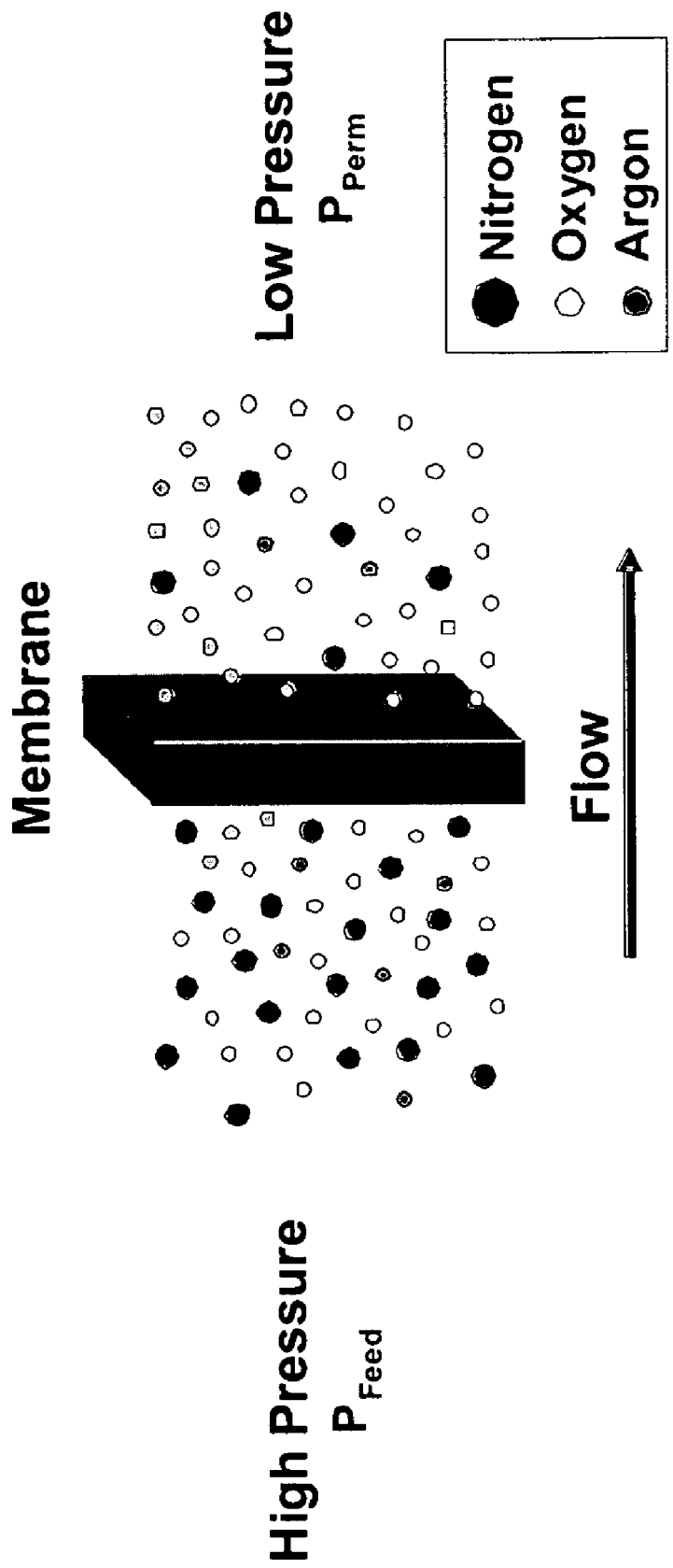
FIG. 1 shows a schematic side view of an oxygen-selective membrane separation process.
Figure 2:
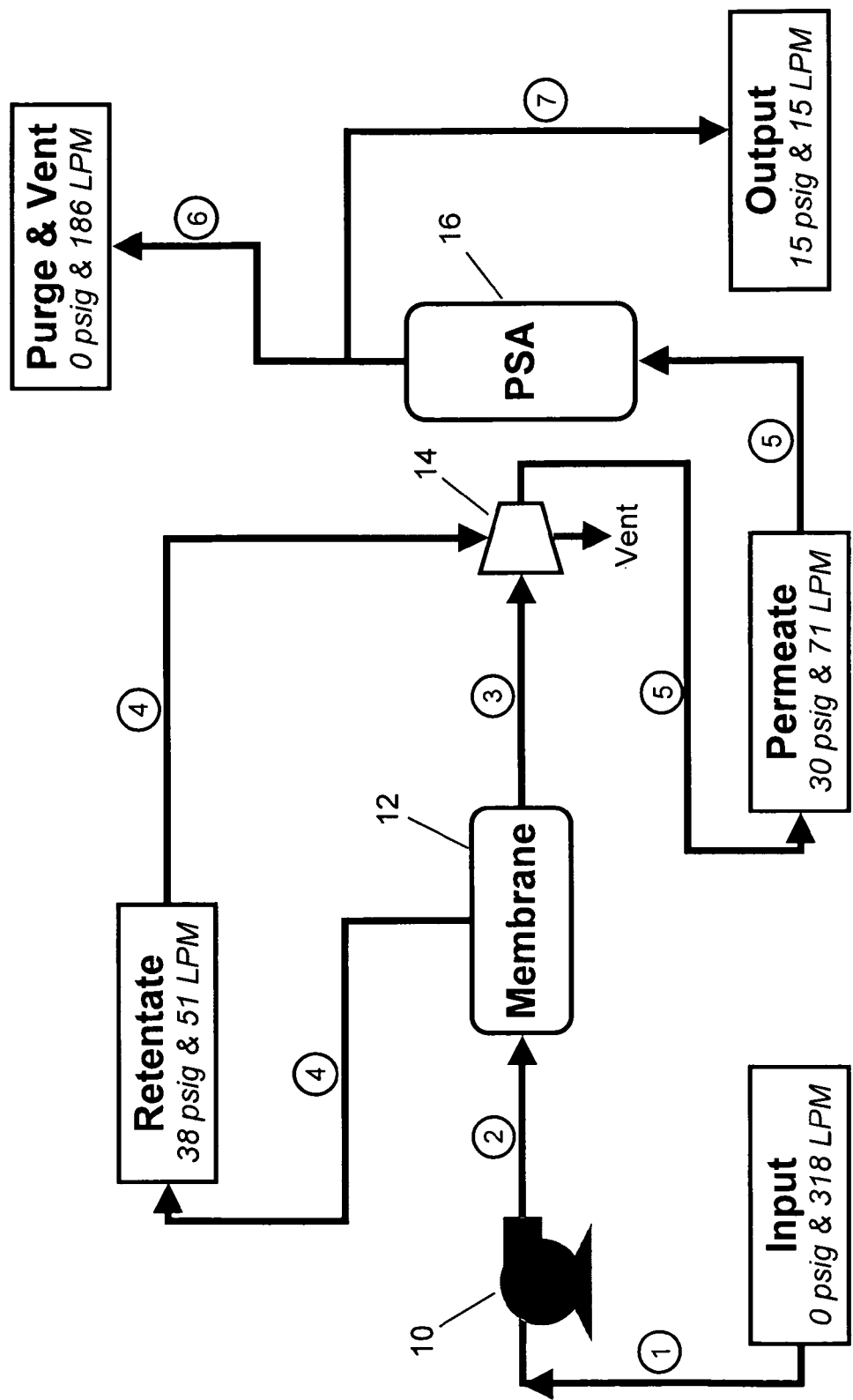
FIG. 2 shows an oxygen separation system, without recycle, according to the present invention, without recycle.

In the hybrid membrane-PSA system as shown in FIG. 2, input air stream (1) is compressed by high-pressure pump 10. The stream (2) of compressed air is fed into the membrane separation module 12, which generates a permeate stream (3) of enriched oxygen (25-40% pure oxygen) having most of the argon removed. The enriched oxygen permeate stream (3) is re-compressed by turbine 14 and then fed into a PSA unit 16, which further enriches the oxygen stream to purities greater than 98% by removing most of the remaining nitrogen. Feeding the PSA unit 16 with an enriched stream of oxygen (3) increases the efficiency of the PSA separation; compared to the typical stand-alone PSA unit. In addition, the nitrogen-rich retentate stream (4) is used power the turbine 14 located in-between the membrane 12 and PSA 16, to further reduce power consumption.

Two variations are envisioned for this system, one utilizing a recycle of the PSA vent gases (FIG. 3); and one without (FIG. 2). Both configurations produce oxygen gas at purities greater than 98% for a flow rate of 15 L/min (LPM).

In the no-recycle configuration, mass balance calculations show oxygen gas could be produced at a purity of 98.6% with a flow rate of 15 L/min. In addition, the bed size of the PSA unit 16 could be reduced by 55%, when compared to a standalone PSA unit producing a comparable flow. The efficiency of recovering oxygen from air is 36% for the no-recycle system.

Figure 3:
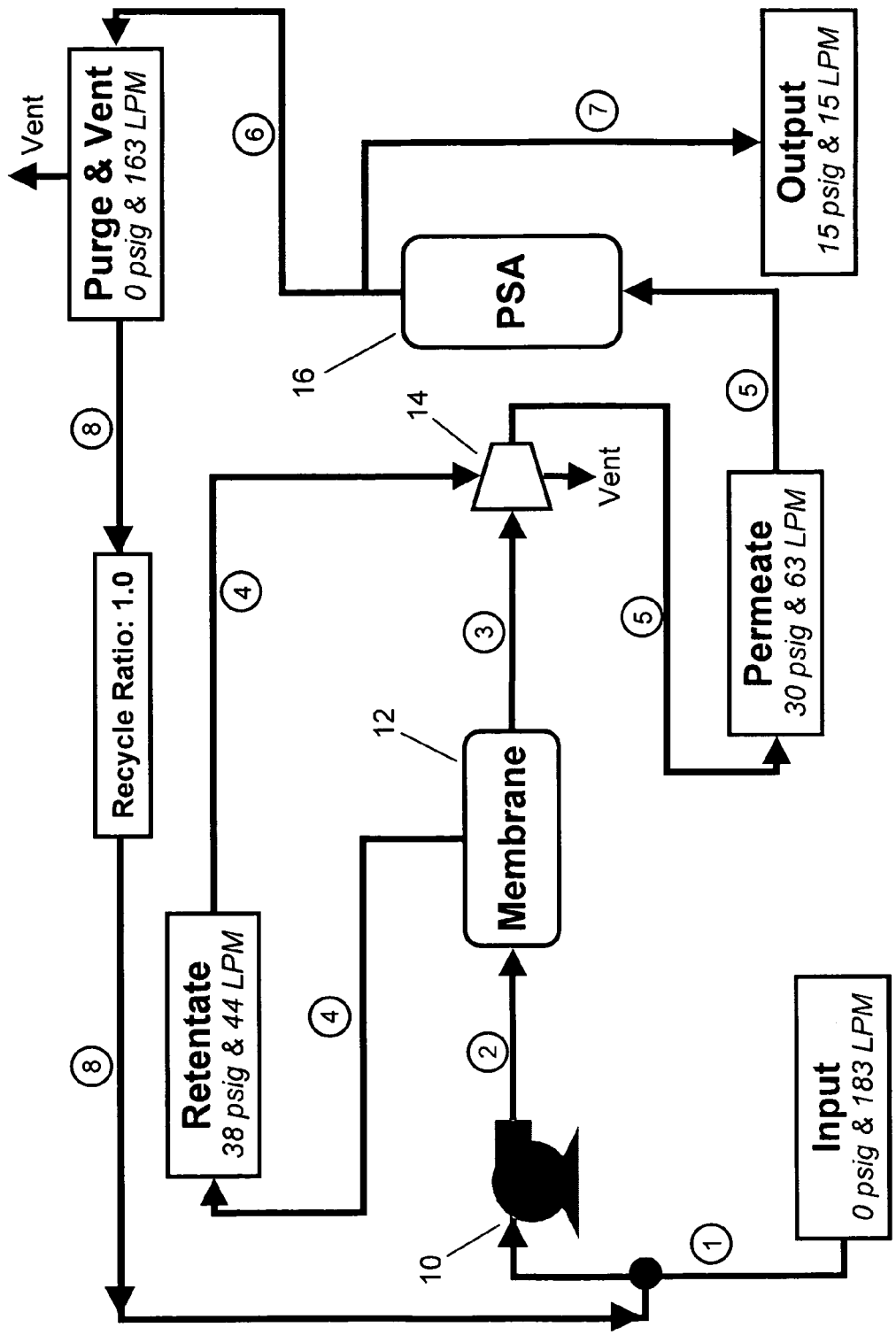
FIG. 3 shows an oxygen separation system with recycle, according to the present invention, with recycle.

For the recycle system, which recycles the vent and purge streams of the PSA (stream (8) in FIG. 3), oxygen gas can be produced at a purity of 99.2% for a flow rate of 15 L/min. In a continuous chemical process such as pressure swing adsorption the recycle ratio is the ratio of the PSA vent/purge gas to fresh incoming feed gas. The higher the recycle ratio, the higher the overall recovery. There is a slightly larger reduction in the PSA bed mass, 62%, compared to the no-recycle option. However, oxygen recovery from air increases substantially from 36% to 78%. This increase in efficiency translates directly to energy and size savings.

Typically, the processes of the present invention are run at ambient temperature, e.g., 20-25° C. The processes are non-cryogenic.

No-Recycle Example

In this example of a 'no-recycle' process (corresponding to FIG. 2), the following design basis assumptions were made:
Delivery target=15.0 L/min
Delivery pressure=1.0 atm
Membrane selectivity=2.0
$N_2$/Ar Selectivity=2.0
Pressure for Membrane target I=100.0 psig
Pressure for PSA target 11=30.0 psig
Atmospheric pressure=14.69 psi
Incoming $O_2$ composition=0.21
Incoming $N_2$ composition=0.78
Incoming Ar composition=0.01
Recycle Ratio=N/A
Membrane efficiency ($O_2$ recovery from air)=90.0%
PSA system $N_2$ removal efficiency=99.87%
Fraction of $O_2$ for PSA regeneration step=60.0%
The calculated system values were:
Required input to system=3.72 moles $O_2$/min
System $O_2$ output=15.00 LPM
$O_2$ recovery efficiency=36.0%
$O_2$ purity=98.6%
Available pressure for turbine=37.55 psig
Reduction in PSA bed mass=54.7%

Table 1 summarizes the flow pressure, flow rate, and gas composition for the No-Recycle example above.

TABLE 1

No-Recycle Option

| Stream | Pressure (psig) | Flow Rate (LPM) | Gas Composition |
|---|---|---|---|
| 1 | 0 | 318 | 21.0% $O_2$ @ 3.72 mol/min (83.3 LPM)<br>78.0% $N_2$ @ 13.8 mol/min (310 LPM)<br>1.0% Ar @ 0.18 mol/min (4.0 LPM) |
| 2 | 100 | 51 | |
| 3 | 0 | 216 | |
| 4 | 38 | 51 | 4.6% $O_2$ @ 0.37 mol/min (2.3 LPM)<br>93.7% $N_2$ @ 7.56 mol/min (47.6 LPM)<br>1.7% Ar @ 0.14 mol/min (0.14 LPM) |
| 5 | 30 | 71 | 34.7% $O_2$ @ 3.35 mol/min (24.7 LPM)<br>64.9% $N_2$ @ 6.25 mol/min (46.1 LPM)<br>0.4% Ar @ 0.04 mol/min (0.3 LPM) |
| 6 | 0 | 186 | 24.2% $O_2$ @ 2.01 mol/min (45.0 LPM)<br>75.5% $N_2$ @ 6.25 mol/min (140 LPM)<br>0.3% Ar @ 0.02 mol/min (0.5 LPM) |
| 7 | 15 | 15 | 98.6% $O_2$ @ 1.34 mol/min (15.0 LPM)<br>0.2% $N_2$ @ 0.00 mol/min (0.0 LPM)<br>1.2% Ar @ 0.02 mol/min (0.2 LPM) |

Recycle Example

In this example of a 'Recycle' process (corresponding to FIG. 3), the following design basis assumptions were made:
Delivery target=15.0 L/min
Delivery pressure=1.0 atm
Membrane selectivity=2.0
$N_2$/Ar Selectivity=2.0
Pressure for Membrane target I=100.0 psig
Pressure for PSA target 11=30.0 psig
Atmospheric pressure=14.69 psi
Incoming $O_2$ composition=0.21
Incoming $N_2$ composition=0.78
Incoming Ar composition=0.01
Recycle Ratio=1.0
Membrane efficiency ($O_2$ recovery from air)=90.0%
PSA system N2 removal efficiency=99.87%
Fraction of $O_2$ for PSA regeneration step=60.0%
The calculated system values were:
Required input to system=3.72 moles $O_2$/min
Air Input=8.14 moles of air/min
Recycle Input=7.25 moles of recycle gas/min
System $O_2$ output=15.00 LPM
$O_2$ recovery efficiency=78.3%
$O_2$ purity=99.2%
Available pressure for turbine=35.93 psig
Reduction in PSA bed mass=62.1%

Table 2 summarizes the flow pressure, flow rate, and gas composition for the Recycle example above.

TABLE 2

Recycle Option

| Stream | Pressure (psig) | Flow Rate (LPM) | Gas Composition |
|---|---|---|---|
| 1 | 0 | 183 | 21.0% $O_2$ @ 1.71 mol/min (38.3 LPM)<br>78.0% $N_2$ @ 6.35 mol/min (142 LPM)<br>1.0% Ar @ 0.08 mol/min (1.8 LPM) |
| 2 | 100 | 42.2 | |
| 3 | 0 | 193 | |
| 4 | 38 | 44 | 5.5% $O_2$ @ 0.37 mol/min (2.4 LPM)<br>93.5% $N_2$ @ 6.35 mol/min (41.3 LPM)<br>0.07% Ar @ 0.07 mol/min (0.5 LPM) |
| 5 | 30 | 63 | 38.9% $O_2$ @ 3.35 mol/min (24.7 LPM)<br>60.8% $N_2$ @ 5.23 mol/min (38.6 LPM)<br>0.2% Ar @ 0.02 mol/min (0.2 LPM) |
| 6 | 0 | 163 | 27.7% $O_2$ @ 2.01 mol/min (45.0 LPM)<br>72.1% $N_2$ @ 5.23 mol/min (117 LPM)<br>0.2% Ar @ 0.01 mol/min (0.3 LPM) |
| 7 | 15 | 15 | 99.2% $O_2$ @ 1.34 mol/min (15.0 LPM)<br>0.2% $N_2$ @ 0.00 mol/min (0.0 LPM)<br>0.6% Ar @ 0.01 mol/min (0.1 LPM) |

The particular examples discussed above are cited to illustrate particular embodiments of the invention. Other applications and embodiments of the apparatus and method of the present invention will become evident to those skilled in the art. It is to be understood that the invention is not limited in its application to the details of construction, materials used, and the arrangements of components set forth in the following description or illustrated in the drawings.

The scope of the invention is defined by the claims appended hereto.

What is claimed is:

1. A method of generating high-purity oxygen gas from air with the aid of a hybrid membrane/PSA system, comprising:
   a) feeding an input stream of air to a compressor;
   b) compressing the input air stream to a high pressure with a compressor;
   c) feeding the compressed air to a membrane separation unit, thereby generating an oxygen-rich permeate stream of enriched oxygen with most of the argon removed, and generating a nitrogen-rich retentate stream of enriched nitrogen and argon;
   d) feeding the permeate stream to a turbine;
   e) re-compressing the permeate stream to a medium pressure with the turbine;
   f) feeding the re-compressed permeate stream to a PSA unit, thereby generating an output oxygen stream with high purity;
   g) generating a purge and vent stream from the PSA unit; and
   h) using the nitrogen-rich retentate stream to power the turbine, thereby reducing total system power use;
   whereby the purity of the output oxygen stream is greater than about 98%.

2. The method of claim 1, wherein the temperature of the streams is at ambient temperature.

3. The method of claim 1, wherein the membrane has a membrane selectivity greater than or equal to 2.

4. The method of claim 1, wherein the membrane has a $N_2/Ar$ selectivity greater than or equal to 2.

5. The method of claim 1, wherein the input air stream is compressed to a high pressure greater than or equal to 100 psig in step b).

6. The method of claim 1, wherein the permeate stream is compressed to a medium pressure greater than or equal to 30 psig in step e).

7. The method of claim 1, wherein the membrane has a membrane efficiency for recovering $O_2$ from air greater than or equal to 90%.

8. The method of claim 1, wherein the PSA system has a $N_2$ removal efficiency greater than or equal to 99.87%.

9. The method of claim 1, wherein the fraction of $O_2$ for PSA regeneration step is less than or equal to 60%.

10. The method of claim 1, wherein the system generates a high purity oxygen output stream of at least 98.6% $O_2$ purity at 15 L/min and 15 psig pressure, with an overall $O_2$ recovery efficiency of at least 36%, for an input air stream of 318 L/min at 0 psig.

11. The method of claim 1, wherein:
   the input stream consists of 21.0% $O_2$, 78.0% $N_2$ and 1.0% Ar;
   the permeate stream consists of 34.7% $O_2$, 64.9% $N_2$ and 0.4% Ar;
   the retentate stream consists of 4.6% $O_2$, 93.7% $N_2$ and 1.7% Ar;
   the purge and vent stream consists of 24.2% $O_2$, 75.5% $N_2$ and 0.3% Ar; and
   the output stream consists of 98.6% $O_2$, 0.2% $N_2$ and 1.2% Ar.

12. The method of claim 1, further comprising recycling the purge and vent stream back to feed into the input stream going to the membrane separation unit.

13. A method of generating high-purity oxygen gas from air with the aid of a hybrid membrane/PSA system, comprising:
   a) feeding an input stream of air to a compressor;
   b) compressing the input air stream to a high pressure with a compressor;
   c) feeding the compressed air to a membrane separation unit, thereby generating an oxygen-rich permeate stream of enriched oxygen with most of the argon removed, and generating a nitrogen-rich retentate stream of enriched nitrogen and argon;
   d) feeding the permeate stream to a turbine;
   e) re-compressing the permeate stream to a medium pressure with the turbine;
   f) feeding the re-compressed permeate stream to a PSA unit, thereby generating an output oxygen stream with high purity;
   g) generating a purge and vent stream from the PSA unit; and
   h) using the nitrogen-rich retentate stream to power the turbine, thereby reducing total system power use;
   whereby the purity of the output oxygen stream is greater than 98%;
   wherein the temperature of the streams is at ambient temperature;
   wherein the membrane has a membrane selectivity greater than or equal to 2;
   wherein the membrane has a $N_2/Ar$ selectivity greater than or equal to 2;
   wherein the input air stream is compressed to a high pressure greater than or equal to 100 psig in step b);
   wherein the permeate stream is compressed to a medium pressure greater than or equal to 30 psig in step e);
   wherein the membrane has a membrane efficiency for recovering $O_2$ from air greater than or equal to 90%;
   wherein the PSA system has a $N_2$ removal efficiency greater than or equal to 99.87%;
   wherein the fraction of $O_2$ for PSA regeneration step is less than or equal to 60%;
   wherein the system generates a high purity oxygen output stream of at least 98.6% $O_2$ purity at 15 L/min and 15 psig pressure, with an overall $O_2$ recovery efficiency of at least 36%, for an input air stream of 318 L/min at 0 psig; and
   wherein:
      the input stream consists of 21.0% $O_2$, 78.0% $N_2$ and 1.0% Ar;
      the permeate stream consists of 34.7% $O_2$, 64.9% $N_2$ and 0.4% Ar;
      the retentate stream consists of 4.6% $O_2$, 93.7% $N_2$ and 1.7% Ar;
      the purge and vent stream consists of 24.2% $O_2$, 75.5% $N_2$ and 0.3% Ar; and
      the output stream consists of 98.6% $O_2$, 0.2% $N_2$ and 1.2% Ar.

14. A method of generating high-purity oxygen gas from air with the aid of a hybrid membrane/PSA system, comprising:
  a) feeding an input stream of air to a compressor;
  b) compressing the input air stream to a high pressure with a compressor;
  c) feeding the compressed air to a membrane separation unit, thereby generating an oxygen-rich permeate stream of enriched oxygen with most of the argon removed, and generating a nitrogen-rich retentate stream of enriched nitrogen and argon;
  d) feeding the permeate stream to a turbine;
  e) re-compressing the permeate stream to a medium pressure with the turbine;
  f) feeding the re-compressed permeate stream to a PSA unit, thereby generating an output oxygen stream with high purity;
  g) generating a purge and vent stream from the PSA unit;
  h) using the nitrogen-rich retentate stream to power the turbine, thereby reducing total system power use; and
  i) recycling the purge and vent stream back to feed into the input stream going to the membrane separation unit;
  whereby the purity of the output oxygen stream is greater than about 98%.

15. The method of claim 14, wherein the temperature of the streams is at ambient temperature.

16. The method of claim 14, wherein the membrane has a membrane selectivity greater than or equal to 2.

17. The method of claim 14, wherein the membrane has a $N_2$/Ar selectivity greater than or equal to 2.

18. The method of claim 14, wherein the input air stream is compressed to a high pressure greater than or equal to 100 psig in step b).

19. The method of claim 14, wherein the permeate stream is compressed to a medium pressure greater than or equal to 30 psig in step e).

20. The method of claim 14, wherein the membrane has a membrane efficiency for recovering $O_2$ from air greater than or equal to 90%.

21. The method of claim 14, wherein the PSA system has a $N_2$ removal efficiency greater than or equal to 99.87%.

22. The method of claim 14, wherein the fraction of $O_2$ for PSA regeneration step is less than or equal to 60%.

23. The method of claim 14, wherein the system generates a high purity oxygen output stream of at least 99.2% $O_2$ purity at 15 L/min and 15 psig pressure, with an overall $O_2$ recovery efficiency of at least 78.3%, for an input air stream of 183 L/min at 0 psig.

24. The method of claim 14, wherein:
  the input stream consists of 21.0% $O_2$, 78.0% $N_2$ and 1.0% Ar;
  the permeate stream consists of 38.9% $O_2$, 60.8% $N_2$ and 0.2% Ar;
  the retentate stream consists of 5.5% $O_2$, 93.7% $N_2$ and 0.07% Ar;
  the purge and vent stream consists of 27.7% $O_2$, 72.1% $N_2$ and 0.2% Ar; and
  the output stream consists of 99.2% $O_2$, 0.2% $N_2$ and 0.6% Ar.

25. A method of generating high-purity oxygen gas from air with the aid of a hybrid membrane/PSA system, comprising:
  a) feeding an input stream of air to a compressor;
  b) compressing the input air stream to a high pressure with a compressor;
  c) feeding the compressed air to a membrane separation unit, thereby generating an oxygen-rich permeate stream of enriched oxygen with most of the argon removed, and generating a nitrogen-rich retentate stream of enriched nitrogen and argon;
  d) feeding the permeate stream to a turbine;
  e) re-compressing the permeate stream to a medium pressure with the turbine;
  f) feeding the re-compressed permeate stream to a PSA unit, thereby generating an output oxygen stream with high purity;
  g) generating a purge and vent stream from the PSA unit; and
  h) using the nitrogen-rich retentate stream to power the turbine, thereby reducing total system power use; and
  i) recycling the purge and vent stream back to feed into the input stream going to the membrane separation unit;
  whereby the purity of the output oxygen stream is greater than 98%;
  wherein the temperature of the streams is at ambient temperature;
  wherein the membrane has a membrane selectivity greater than or equal to 2;
  wherein the membrane has a $N_2$/Ar selectivity greater than or equal to 2;
  wherein the input air stream is compressed to a high pressure greater than or equal to 100 psig in step b);
  wherein the permeate stream is compressed to a medium pressure greater than or equal to 30 psig in step e);
  wherein the membrane has a membrane efficiency for recovering $O_2$ from air greater than or equal to 90%;
  wherein the PSA system has a $N_2$ removal efficiency greater than or equal to 99.87%;
  wherein the fraction of $O_2$ for PSA regeneration step is less than or equal to 60%;
  wherein the system generates a high purity oxygen output stream of at least 99.2% $O_2$ purity at 15 L/min and 15 psig pressure, with an overall $O_2$ recovery efficiency of at least 78.3%, for an input air stream of 183 L/min at 0 psig.; and
  wherein:
    the input stream consists of 21.0% $O_2$, 78.0% $N_2$ and 1.0% Ar;
    the permeate stream consists of 38.9% $O_2$, 60.8% $N_2$ and 0.2% Ar;
    the retentate stream consists of 5.5% $O_2$, 93.7% $N_2$ and 0.07% Ar;
    the purge and vent stream consists of 27.7% $O_2$, 72.1% $N_2$ and 0.2% Ar; and
    the output stream consists of 99.2% $O_2$, 0.2% $N_2$ and 0.6% Ar.

* * * * *